US012253817B2

(12) United States Patent
Suzuki et al.

(10) Patent No.: US 12,253,817 B2
(45) Date of Patent: Mar. 18, 2025

(54) IMAGE FORMING APPARATUS THAT DETECTS AN IMAGE ON A SHEET WHILE SHEET CONVEYANCE IS STOPPED

(71) Applicant: CANON KABUSHIKI KAISHA, Tokyo (JP)

(72) Inventors: Koji Suzuki, Chiba (JP); Shingo Iwami, Tokyo (JP); Yuma Inui, Ibaraki (JP); Yoshiya Numata, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/972,821

(22) Filed: Oct. 25, 2022

(65) Prior Publication Data

US 2023/0139410 A1 May 4, 2023

(30) Foreign Application Priority Data

Nov. 1, 2021 (JP) ................................ 2021-178496

(51) Int. Cl.
*G03G 15/00* (2006.01)
*G03G 15/23* (2006.01)

(52) U.S. Cl.
CPC ......... *G03G 15/5062* (2013.01); *G03G 15/23* (2013.01); *G03G 15/231* (2013.01); *G03G 15/232* (2013.01); *G03G 15/234* (2013.01); *G03G 15/235* (2013.01); *G03G 15/6579* (2013.01); *G03G 2215/00417* (2013.01); *G03G 2215/0043* (2013.01); *G03G 2215/00438* (2013.01); *G03G 2215/00586* (2013.01); *G03G 2215/00599* (2013.01); *G03G 2215/00759* (2013.01)

(58) Field of Classification Search
CPC .... G03G 15/23; G03G 15/231; G03G 15/232; G03G 15/234; G03G 15/235; G03G 15/5062; G03G 15/6573; G03G 15/6579; G03G 2215/00417; G03G 2215/0043; G03G 2215/00438; G03G 2215/00586; G03G 2215/00599; G03G 2215/00759
See application file for complete search history.

(56) References Cited

U.S. PATENT DOCUMENTS

| | | | | |
|---|---|---|---|---|
| 7,177,585 | B2 | 2/2007 | Matsuzaka et al. | |
| 8,301,073 | B2 * | 10/2012 | Ueda .................. | G03G 15/6552 399/401 |
| 2020/0218187 | A1 * | 7/2020 | Takahashi .......... | G03G 15/5025 |

FOREIGN PATENT DOCUMENTS

| | | |
|---|---|---|
| JP | 2004279749 A | 10/2004 |

* cited by examiner

*Primary Examiner* — Joseph S Wong
(74) *Attorney, Agent, or Firm* — ROSSI, KIMMS & McDOWELL LLP

(57) ABSTRACT

An image forming apparatus includes an image forming unit configured to form an image on a sheet, a reversing unit configured to convey a sheet conveyed from the image forming unit in a first direction, stop the conveyance, and then convey the sheet in a second direction, which is opposite to the first direction, an image detection unit disposed to detect at least a portion of the image on the sheet stopped by the reversing unit, and a control unit configured to control the reversing unit and the image detection unit. The control unit is configured to detect the image on the sheet by the image detection unit while the sheet conveyance is stopped by the reversing unit.

12 Claims, 12 Drawing Sheets

(AFTER CORRECTION)

(BEFORE CORRECTION)

(BEFORE CORRECTION)

(AFTER CORRECTION)

IMAGE FORMING APPARATUS THAT DETECTS AN IMAGE ON A SHEET WHILE SHEET CONVEYANCE IS STOPPED

BACKGROUND OF THE INVENTION

Field of the Invention

The present invention relates to an image forming apparatus including an image detection unit that detects at least a portion of an image on a sheet.

Description of the Related Art

For example, in some printers, copiers, fax machines, multifunction printers, and other image forming apparatuses, after forming an image on the first side (front side) of a sheet in the image forming unit, the sheet is reversed in the conveyance direction and re-transferred to the image forming unit again to form an image on the second side (back side) of the sheet. In such a system that forms images on both sides of a sheet, errors or variations in conveying speed may cause position deviation of the image formed on a sheet when forming an image on the first side of the sheet. If another image is subsequently formed on the second side, the images on both sides may be misaligned, resulting in a deterioration of the quality of the product.

Therefore, an apparatus has been proposed that uses an image detection sensor to detect the distance between the position of the registration mark formed on the first side and the edge of the sheet, and adjusts the image formation position based on the detection result when forming an image on the second side (see JP 2004-279749 A).

In recent years, high productivity has been demanded of so-called high-end apparatuses, which require particularly high front-to-back registration accuracy, and sheet conveying speeds have therefore been increased. However, in the detection of images formed on the first side of a sheet, as in JP 2004-279749 A described above, there is a problem that as the sheet conveying speed increases, sheet fluttering or insufficient resolution of the sensor occurs, resulting in a large detection error. If the detection error in detecting the position of the image on the first side is large, the error will affect, for example, the adjustment of the position of the image formed on the second side, resulting in a deterioration of the quality of the product.

SUMMARY OF THE INVENTION

According to a first aspect of the present invention, an image forming apparatus includes an image forming unit configured to form an image on a sheet, a reversing unit configured to convey a sheet conveyed from the image forming unit in a first direction, stop the conveyance, and then convey the sheet in a second direction, which is opposite to the first direction, an image detection unit disposed to detect at least a portion of the image on the sheet stopped by the reversing unit, and a control unit configured to control the reversing unit and the image detection unit. The control unit is configured to detect the image on the sheet by the image detection unit while the sheet conveyance is stopped by the reversing unit.

According to a second aspect of the present invention, an image forming apparatus includes an image forming unit configured to form an image on a sheet, a conveyance unit configured to convey the sheet on which an image has been formed in the image forming unit and stop the sheet conveyance, an image detection unit configured to detect the image on the sheet, and a control unit configured to control the conveyance unit and the image detection unit. The control unit is configured to detect at least a portion of the image on the sheet by the image detection unit while the sheet conveyance is stopped by the conveyance unit.

Further features of the present invention will become apparent from the following description of exemplary embodiments with reference to the attached drawings.

DESCRIPTION OF THE EMBODIMENTS

First Embodiment

Hereinafter, an image forming apparatus according to the first embodiment will be described with reference to the drawings. The dimensions, materials, shapes, relative arrangements, and others of the components described in the following first embodiment are not intended to limit the scope of application of the present technology only to them unless otherwise specified.

Schematic Configuration of Image Forming Apparatus

Figure 1:
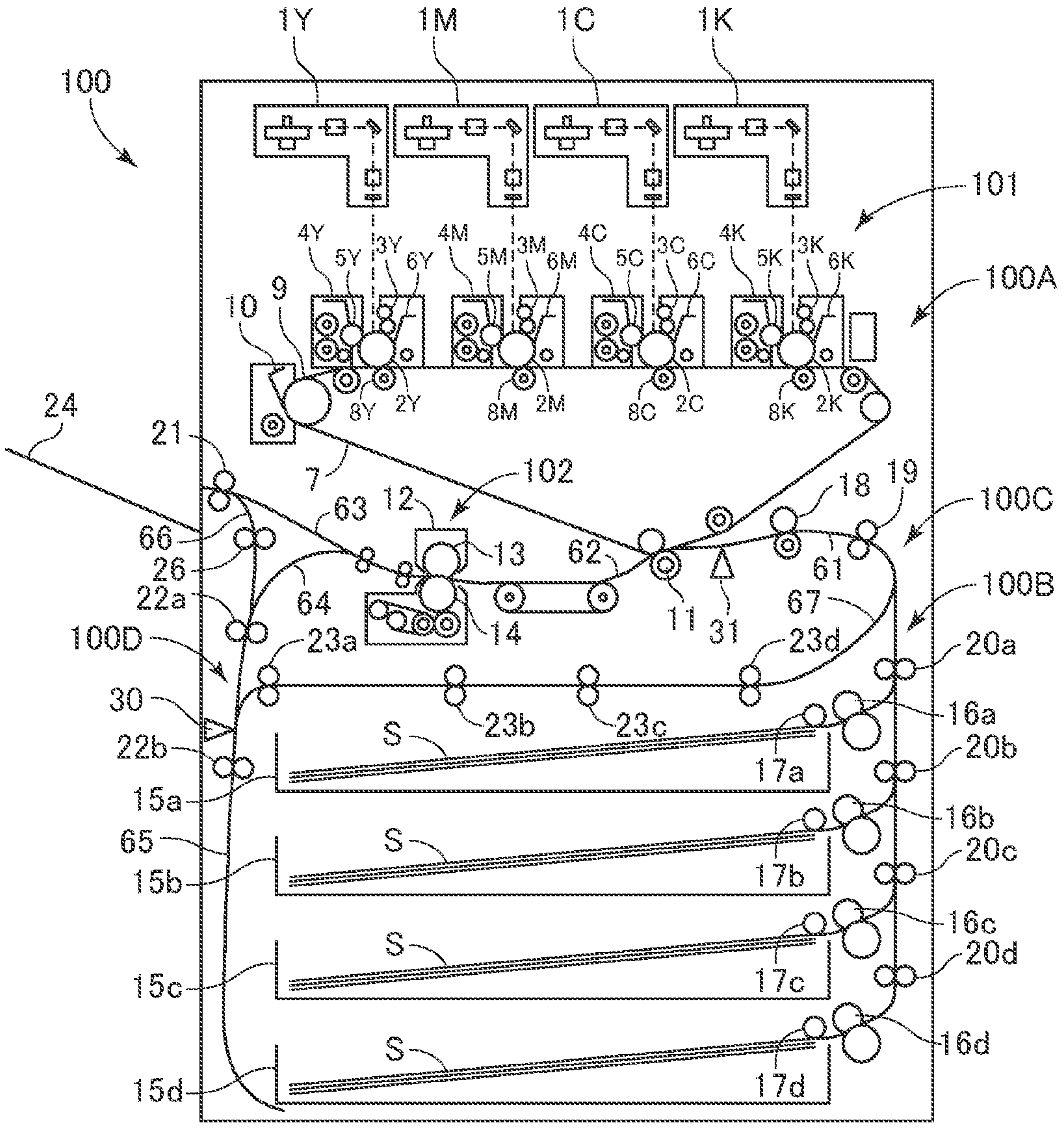
FIG. 1 is a schematic cross-sectional view of an image forming apparatus according to a first embodiment.

FIG. 1 is a schematic cross-sectional view of the image forming apparatus 100 according to the first embodiment. In the present embodiment, an image forming apparatus 100, which is a laser beam printer of electrophotographic system, is described as an example of an image forming apparatus, but the image forming apparatus is not limited thereto, and may be an LED printer, an inkjet printer, a sublimation printer, or the like.

The image forming apparatus 100 includes an image forming unit 100A, which is a so-called printer engine, a sheet feeding unit 100B, a sheet conveying unit 100C, and a sheet reversing unit 100D. The image forming unit 100A includes an optical processing mechanism 101 and a fixing processing mechanism 102 that form an image on a recording material through an image forming process. The sheet feeding unit 100B feeds a rectangular sheet used as a recording material. The sheet conveying unit 100C conveys the fed sheet to the image forming unit 100A and discharges the sheet, or re-conveys the reversed sheet to the image forming unit 100A. The sheet reversing unit 100D reverses the conveyance direction of a sheet on which an image has been formed by the image forming unit 100A, and either re-conveys the sheet to the image forming unit 100A or reverses it front to back and discharges it. The recording material may be, for example, paper such as plain paper or cardboard, paper with surface treatment such as coated paper or embossed paper, plastic film, or cloth.

The optical processing mechanism 101 forms yellow, magenta, cyan, and black toner images and transfers them to an intermediate transfer belt 7. Specifically, the optical processing mechanism 101 includes laser scanner units 1Y, 1M, 1C, and 1K, photosensitive drums 2Y, 2M, 2C, and 2K, charging rollers 3Y, 3M, 3C, and 3K, developers 4Y, 4M, 4C, and 4K, and developing sleeves 5Y, 5M, 5C, and 5K corresponding to respective colors. The optical processing mechanism 101 further includes cleaner units 6Y, 6M, 6C, and 6K, and primary transfer rollers 8Y, 8M, 8C, and 8K corresponding to respective colors. The optical processing mechanism 101 further includes the intermediate transfer belt 7, an intermediate transfer belt driving roller 9, a cleaner unit 10, and a secondary transfer roller 11. On the other hand, the fixing processing mechanism 102 includes a fusing unit 12 as a fixing portion, and the fixing unit 12 has a fixing roller 13 and a pressure roller 14.

The sheet feeding unit 100B includes sheet feeding cassettes 15*a*, 15*b*, 15*c*, and 15*d* that store sheets S, feeding rollers 17*a*, 17*b*, 17*c*, and 17*d*, separation roller pairs 16*a*, 16*b*, 16*c*, and 16*d*, and intermediate conveyance roller pairs 20*a*, 20*b*, 20*c*, and 20*d*. The sheet conveying unit 100C includes a pre-registration roller pair 19 and a registration roller pair 18. The sheet conveying unit 100C further includes a discharge roller pair 21, a reverse discharge roller pair 26, and double-sided conveyance roller pairs 23*a*, 23*b*, 23*c*, and 23*d*. The sheet reversing unit 100D includes a first reverse conveyance roller pair 22*a* and a second reverse conveyance roller pair 22*b*.

Image Forming Operation

Next, an image forming operation in the image forming apparatus 100 will be described. Each of the photosensitive drums 2Y, 2M, 2C, and 2K includes an organic photoconductive layer applied to the outer circumference of an aluminum cylinder, which is rotated in a counterclockwise direction in FIG. 1 by a drive motor (not illustrated). The surfaces of the photosensitive drums 2Y, 2M, 2C, and 2K are charged by the charging rollers 3Y, 3M, 3C, and 3K, respectively. The surfaces of the photosensitive drums 2Y, 2M, 2C, and 2K are then exposed by laser beams emitted from the laser scanner units 1Y, 1M, 1C, and 1K to form electrostatic latent images on these surfaces based on image data sent from a control unit 200 described below. Then, the respective color toners are transferred to the electrostatic latent images by the developing sleeves 5Y, 5M, 5C, and 5K of the developers 4Y, 4M, 4C, and 4K to develop toner images.

The intermediate transfer belt 7 is in contact with the photosensitive drums 2Y, 2M, 2C, and 2K and rotates in a clockwise direction in FIG. 1 by the intermediate transfer belt driving roller 9. Then, the toner images of the respective colors are sequentially transferred from the photosensitive drums 2Y, 2M, 2C, and 2K to the surface of the intermediate transfer belt 7 by the primary transfer rollers 8Y, 8M, 8C, and 8K under the primary transfer bias to form color toner images. The toner residue remaining on the photosensitive drums 2Y, 2M, 2C, and 2K without being transferred to the intermediate transfer belt 7 is collected by the cleaner units 6Y, 6M, 6C, 6K, whereby the photosensitive drums 2Y, 2M, 2C, and 2K are cleaned.

On the other hand, the sheet feeding unit 100B starts feeding the sheets S from any of the sheet feeding cassettes selected from the sheet feeding cassettes 15*a*, 15*b*, 15*c*, and 15*d* by any of the feeding rollers 17*a*, 17*b*, 17*c*, and 17*d* corresponding to the selected sheet feeding cassette. The fed sheets S are separated one by one by any of the separation roller pairs 16*a*, 16*b*, 16*c*, and 16*d* corresponding to the selected sheet feeding cassette, and then conveyed to the sheet conveying unit 100C by the intermediate conveyance roller pairs 20*a*, 20*b*, 20*c*, and 20*d*.

In the sheet conveying unit 100C, the sheet S conveyed by the intermediate conveyance roller pairs 20*a*, 20*b*, 20*c*, and 20*d* is conveyed by the pre-registration roller pair 19 toward the registration roller pair 18 via the pre-transfer conveyance path 61. The registration roller pair 18 conveys the sheet S while adjusting the conveying speed of the sheet S according to the timing when the color toner images transferred on the surface of the intermediate transfer belt 7 reach the secondary transfer roller 11, that is, the sheet S and the toner images are aligned.

Thereafter, the secondary transfer roller 11 and the intermediate transfer belt 7 hold and convey the sheet between them, during which the color toner images on the intermediate transfer belt 7 are superimposed onto the sheet by the secondary transfer bias. The secondary transfer roller 11 is in contact with the intermediate transfer belt 7 while the color toner images are superimposed on the intermediate transfer belt 7, but is separated from the intermediate transfer belt 7 after the transfer is completed. The toner residue remaining on the intermediate transfer belt 7 without being transferred to the sheet S is collected by the cleaner unit 10, whereby the intermediate transfer belt 7 is cleaned.

The sheet S, to which the color toner images have been transferred by the secondary transfer roller 11, is conveyed to the fixing unit 12 of the fixing processing mechanism 102 via the fixing conveyance path 62. The fixing unit 12 heats the sheet S with the fixing roller 13 and applies pressure with the pressure roller 14 to fix the toner images on the sheet S. The fixing roller 13 is formed in a hollow shape and contains a heater (not illustrated) inside.

The sheet S that has passed through the fixing unit 12 is guided from the fixing conveyance path 62 to either a discharge conveyance path 63 or a pre-reverse conveyance path 64 by a flapper (not illustrated). The sheet S conveyed to the pre-reverse conveyance path 64 is guided to the sheet reversing unit 100D, which includes the first reverse conveyance roller pair 22*a*, the second reverse conveyance roller pair 22*b*, and a reversing conveyance path 65 as a conveyance path. That is, the sheet S conveyed to the pre-reverse conveyance path 64 is guided toward the reversing conveyance path 65 by the first reverse conveyance roller pair 22*a* and/or the second reverse conveyance roller pair 22*b*.

In the case of double-sided printing, the sheet S with an image on its front side (first side) is conveyed to the reversing conveyance path 65 until its trailing edge passes the entrance of a re-conveyance path 67. Then, the downstream edge (leading edge) and upstream edge (trailing edge) in the sheet conveyance direction are switched by the switchback operation performed by the second reverse conveyance roller pair 22*b*. With the leading and trailing edges switched by the second reverse conveyance roller pair 22*b*, the sheet is conveyed to the re-conveyance path 67 and guided by the double-sided conveyance roller pairs 23*a*, 23*b*, 23*c*, and 23*d* toward the secondary transfer roller 11 again, where an image is formed on the back side (second side) opposite the front side.

The sheet S, on which image formation on one side of the sheet has been completed, or the sheet S, on which image formation on the back side of the sheet in double-sided printing has been completed, is guided to the discharge conveyance path 63. The sheet S conveyed to the discharge conveyance path 63 is discharged by the discharge roller pair 21 onto a sheet discharge tray 24 provided outside the image forming apparatus 100.

On the other hand, when the sheet S that has passed through the fixing unit 12 is reversed and discharged, the sheet S with an image formed on its surface is guided to the pre-reverse conveyance path 64. It is then conveyed to the reversing conveyance path 65 until its trailing edge passes the entrance to a reversing discharge path 66. Then, the downstream edge (leading edge) and upstream edge (trailing edge) in the sheet conveyance direction are switched by the switchback operation performed by the first reverse conveyance roller pair 22*a*. The sheet S, whose leading and trailing edges have been switched by the first reverse conveyance roller pair 22*a*, is guided to the reversing discharge path 66 and conveyed to the discharge roller pair 21 by the reverse discharge roller pair 26. The sheet S, which is conveyed to the reversing discharge path 66 after being reversed in this manner, is also discharged by the discharge roller pair 21 with the front and back sides reversed on the sheet discharge tray 24 provided outside the image forming apparatus 100.

Control System Configuration of Image Forming Apparatus

Figure 2B:
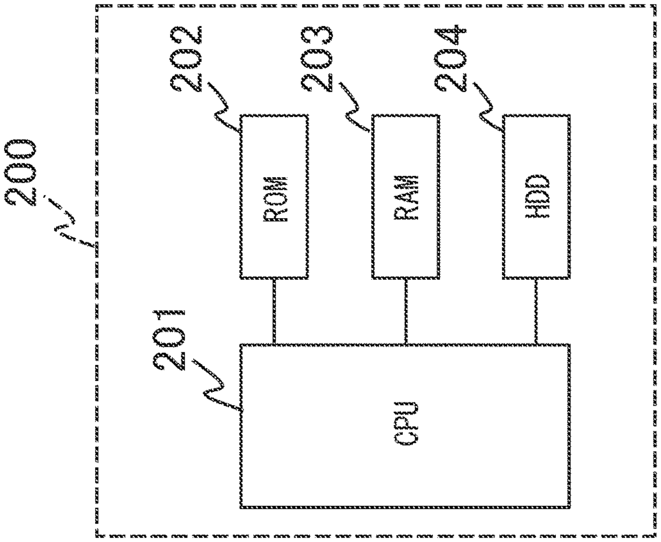
FIG. 2B is a block diagram of a control unit.
Figure 2A:
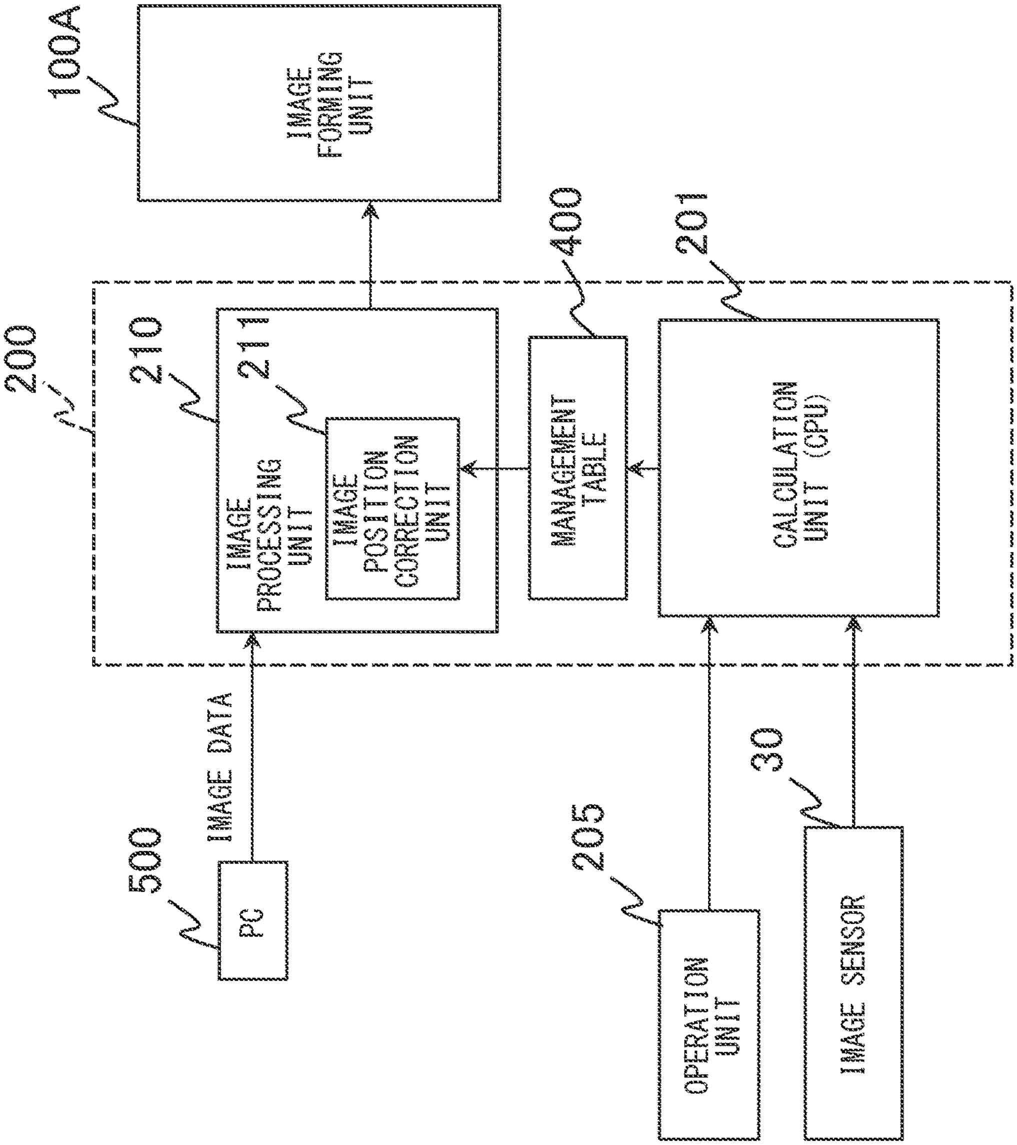
FIG. 2A is a block diagram of a control system of the image forming apparatus according to the first embodiment.

Next, the configuration of the control system of the image forming apparatus 100 is described using FIGS. 2A and 2B. The block diagram in FIG. 2A illustrates the control unit 200 as a function, and the block diagram in FIG. 2B illustrates the control unit 200 as a hardware configuration. As illustrated in FIG. 2A, in the image forming apparatus 100, an operation unit 205, an image sensor 30 as an image detection unit, which will be described below in detail, and the image forming unit 100A described above are connected to the control unit 200. The control unit 200 is connected to a computer (PC) 500 or the like disposed outside via an external interface.

As illustrated in FIG. 2B, the control unit 200 includes a CPU 201, a ROM 202, a RAM 203, and an HDD 204. The CPU 201 is a calculation unit that controls each unit (see FIG. 2A). The ROM 202 stores control programs for various processes executed by the CPU 201. The RAM 203 is a system work memory for the CPU 201 to operate. The HDD 204 stores, for example, image data transferred from the computer 500 and setting information input from the operation unit 205. The HDD 204 stores information in a management table 400, which will be described below in detail.

As illustrated in FIG. 2A, the operation unit 205 is an example of a user interface such as an operation panel, which is omitted in FIG. 1, and has a display unit and a key input unit. The operation unit 205 accepts setting information and other information entered by the user via the display unit and key input unit, and also displays information to the user via the display unit. The key input unit has, for example, a start key to indicate the start of scanning, copying, or other operations, a stop key to stop scanning, copying, or other operations, and a numeric keypad.

The image processing unit 210, which functions by the control unit 200, performs various types of image processing on image data to be formed on the sheet S, such as image data transferred from the computer 500. The image processing unit 210 has an image position correction unit 211, and the image position correction unit 211 corrects the position of the image formed on the sheet S, as will be described below in detail. The functions of the image processing unit 210 may be realized by an integrated circuit such as an ASIC, or by image data processing by the CPU 201 based on a pre-stored program.

The image data generated by the image processing unit 210 is sent to laser scanner units 1Y, 1M, 1C, and 1K of the image forming unit 100A. The laser scanner units 1Y, 1M, 1C, and 1K are controlled based on the image data generated by the image processing unit 210 to expose the surfaces of photosensitive drums 2Y, 2M, 2C, and 2K. As a result, electrostatic latent images based on the image data generated by the image processing unit 210 are formed on the surfaces of the photosensitive drums 2Y, 2M, 2C, and 2K.

Correction of Image Formation Position on Sheet

Figure 3B:
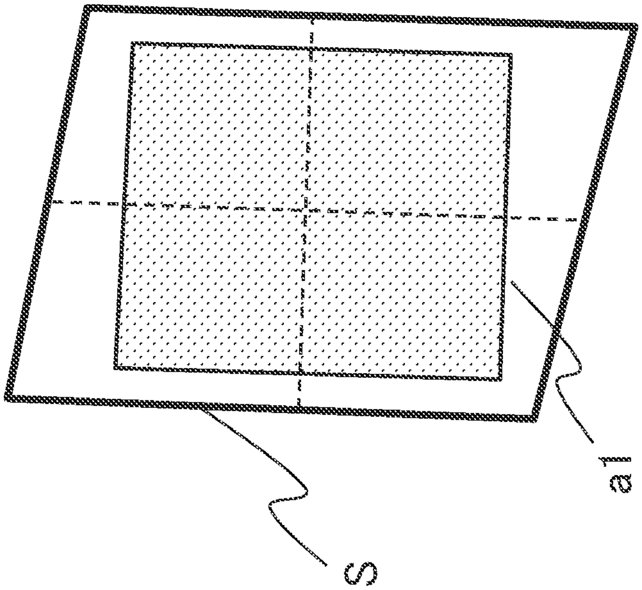
FIG. 3B illustrates the image position with respect to the sheet after correction of the image by the image forming unit.
Figure 3A:
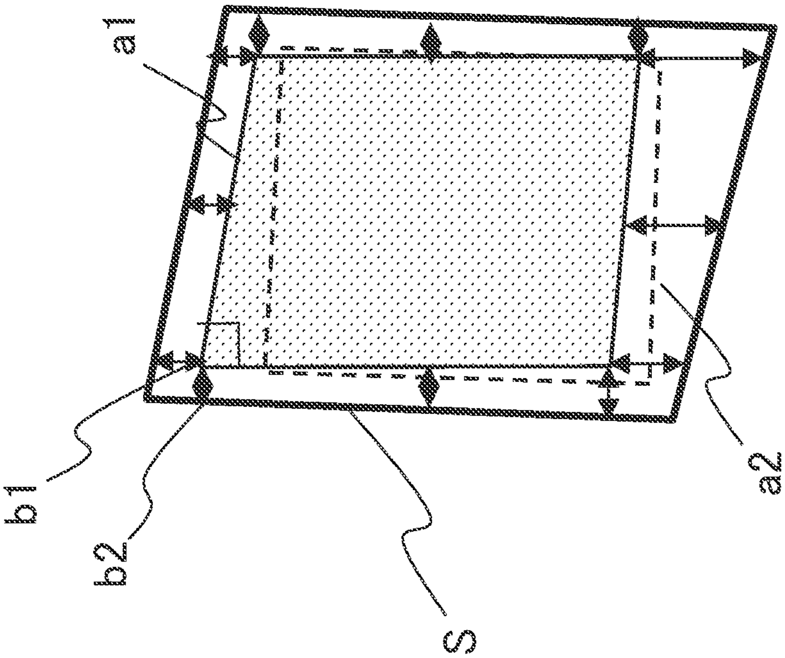
FIG. 3A illustrates the image position with respect to the sheet before correction of the image by the image forming unit.

Next, the correction of the position of the image formation performed by the image position correction unit 211 is described using FIGS. 2 to 3B. FIG. 3A illustrates the image position on the sheet before correction of the image by the image forming unit, and FIG. 3B illustrates the image position on the sheet after correction of the image by the image forming unit.

The position of the image formed on the sheet S in the image forming operation may not be the ideal position. As shown in FIG. 3A, for example, if the sheet S conveyed by the registration roller pair 18 disposed upstream in the conveyance direction of the image forming unit 100A is inclined, the sheet passes through the secondary transfer roller 11 in an inclined state as it is. As a result, the image a1 may be formed inclined to the sheet S, and the image a1 may be formed at a position deviated from the ideal position a2.

In addition, for example, if the pressure distribution of the rollers of the fixing unit 12 is not uniform, the sheet after passing through the fixing unit 12 may be deformed and the image formed on the sheet S may be inclined. That is, for example, when an image is formed on the surface of the sheet S in double-sided printing, the sheet S expands and contracts due to heating and pressure from the fixing unit 12. Then, the size of the image formed on the front side of sheet S may be different from the size of the image formed on the back side of the sheet S. In this case, the position of the image formed on the front side of the sheet S is different from the position of the image formed on the back side of sheet S.

Therefore, at least one or more distances b1 and b2 from the edges of the sheet S, indicated by arrows in FIG. 3A, are measured by the image sensor 30, described below, for the image a1 deviated from the ideal position a2, and the calculation unit 201 calculates the amount of deviation of the image a1 with respect to the sheet S. The image position correction unit 211 controls the laser scanner units 1Y, 1M, 1C, and 1K of the image forming unit 100A so that the image formation position on the sheet is at the ideal position a2 according to the amount of deviation detected by the image sensor 30 in this manner. In short, the image position correction unit 211 corrects the shape of the toner images formed on the photosensitive drums 2Y, 2M, 2C, and 2K and transferred to the intermediate transfer belt 7 so that they are in the ideal position a2.

In this case, the image position correction unit 211 converts the image data based on the conversion formula for correcting the deviation of the image formation position with respect to the sheet stored in the management table 400. When the image forming unit 100A forms an image based on the image data converted by the image position correction unit 211, an image that offsets the deviation of the image formation position with respect to the sheet S is formed on the intermediate transfer belt 7.

The management table 400 stores for each sheet the amount of deviation of image position generated by the calculation unit 201 (described below) and the conversion formula for correcting the amount of deviation. The calculation unit 201 calculates the setting information input from the operation unit 205 and the position information (amount of deviation) of the image obtained by the image sensor 30, based on the information in the control table 400, and stores the calculation results in the management table 400.

Problem of Detection Accuracy of Image Sensor During Sheet Conveyance

The image sensor 30 described above detects the position of the image transferred and fixed on the sheet S and the edges of the sheet S, and includes, for example, a scanner sensor that scans images, such as a contact image sensor (CIS). With such a scanner sensor, as the conveying speed of the sheet S increases, the measurement error due to insufficient measurement resolution becomes larger when measuring the image position of the sheet S. If the measurement error becomes large, when the image formed on the back side of sheet S is corrected by the image position correction unit 211 described above, an error will occur according to the measurement error, and the quality of the product will be degraded. First, the causes of measurement errors are described below using FIG. 11. In the present embodiment, the image sensor 30 includes a CIS, but it may be a scanner sensor such as a charge coupled device (CCD).

Figure 11A:
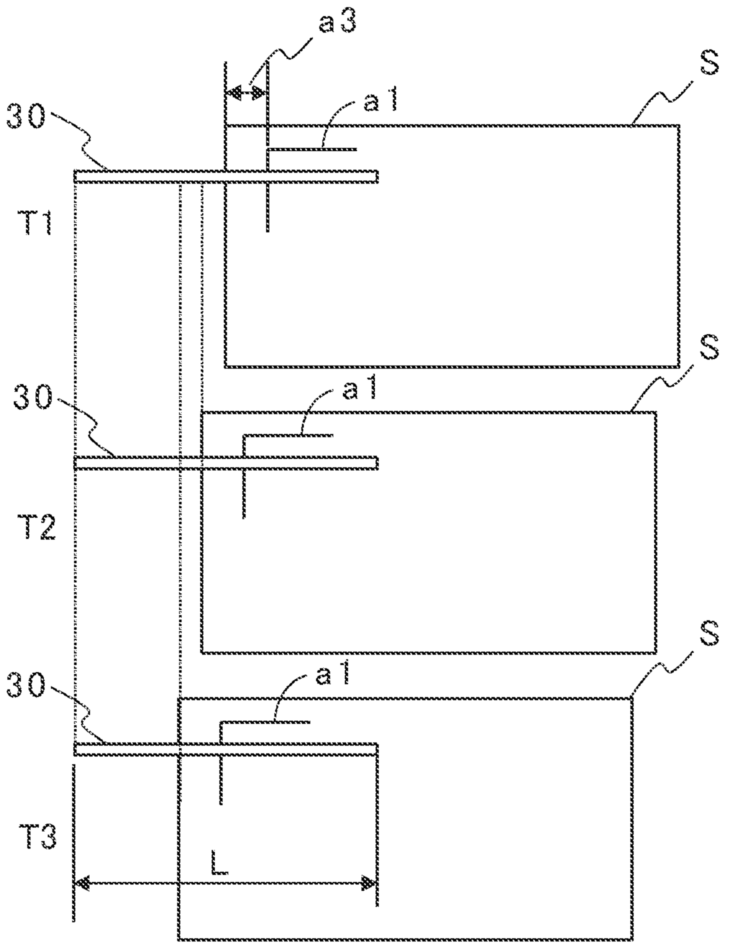
FIG. 11A illustrates the positional relationship between the sheet and the image sensor at time points T1 to T3 during sheet conveyance.
Figure 11B:
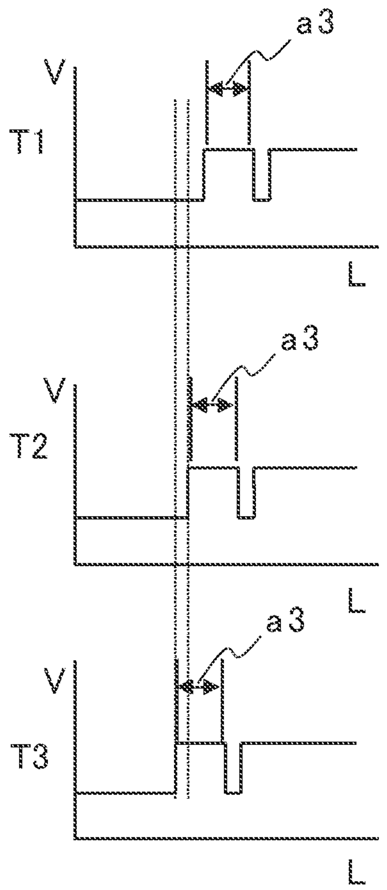
FIG. 11B illustrates the voltage signals of the image sensor at time points T1 to T3 during sheet conveyance.
Figure 11C:
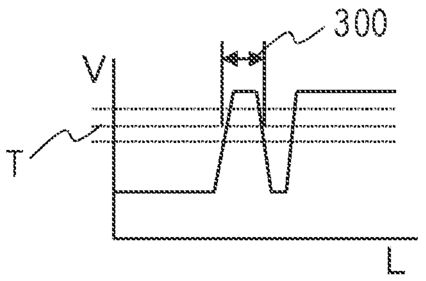
FIG. 11C illustrates the signal waveform of the image sensor acquired during sheet conveyance.

FIG. 11A illustrates the positional relationship between the sheet and the image sensor at time points T1 to T3 during sheet conveyance. FIG. 11B illustrates the voltage signals of the image sensor at time points T1 to T3 during sheet conveyance. FIG. 11C illustrates the signal waveform of the image sensor acquired during sheet conveyance.

As illustrated in FIG. 11A, when the sheet S is being conveyed, the sheet S is advancing at a constant speed when time passes at regular time intervals in the order of time points T1, T2, and T3. At this time, the image sensor 30 reads the image on the first side of the sheet S and acquires the distance a3 from the edge of the sheet S to the edge of the image a1. In this case, in detail, the image sensor 30 irradiates light from a light source onto the object to be measured and measures the reflected light as a voltage value V. Then the voltage values V as the signal values read by the image sensor 30 at time points T1, T2, and T3 in the length L of the detection range of the image sensor 30 are as illustrated in FIG. 11B. That is, they are waveforms whose magnitude changes at the position between the edge of the sheet S and the edge of the image a1, i.e., they are signal waveforms indicating the distance a3.

In this case, the measurement is performed while a certain amount of irradiated light is applied, but only for a moment, there is not enough reflected light to measure color changes such as at the edges of the sheet or in the image, resulting in an extremely small difference in the voltage value V. Therefore, it is necessary to continue measuring the reflected light for a predetermined period of time (expose the camera and charge the voltage) in order to measure sufficient reflected light.

Therefore, as illustrated in FIG. 11B, when measurement is performed on the sheet S that is being conveyed, there is always a phenomenon where the signal waveform shifts even slightly. The shifted signal waveform is then integrated to obtain the exposed and charged signal waveform as illustrated in FIG. 11C. The calculation unit 201 calculates image position information 300 based on the signal waveform, but by measuring at a predetermined time, the signal waveform is not a rectangular wave but a signal with blurred rising and falling edges (afterimage phenomenon).

That is, the calculation unit 201 converts this signal waveform into the image position information 300 by setting a threshold value T. However, depending on how this threshold value T is determined and how the signal waveform is blurred, the correct distance a3 is not obtained and the image position information 300 contains measurement errors. This results in the formation of an image on the second surface that is deviated by the amount of error when correcting the image position on the second side, which degrades the quality of the product.

Sheet Conveyance Operation in Sheet Reversing Unit

Figure 4:
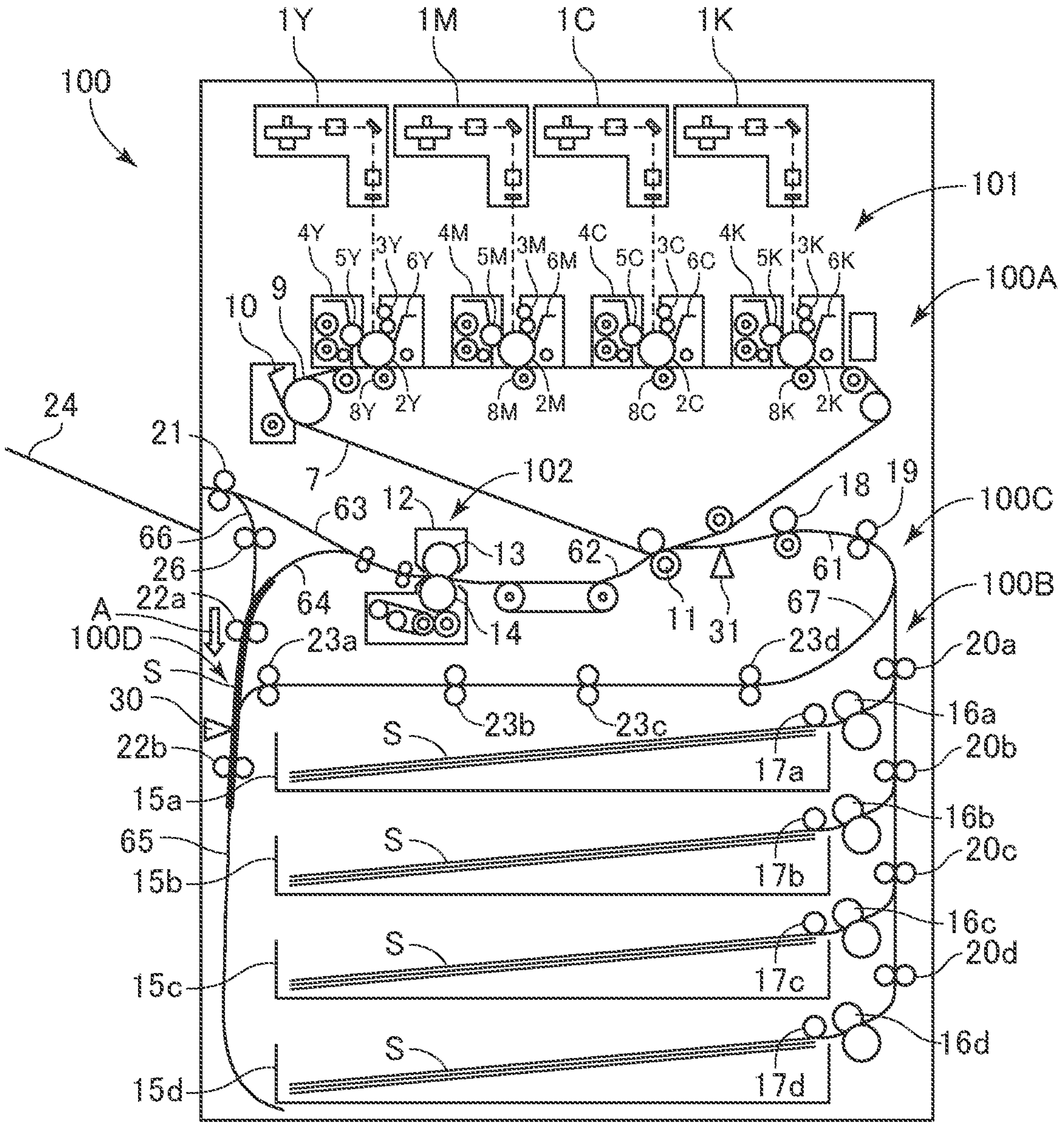
FIG. 4 illustrates the state in which a sheet is conveyed to a second reverse conveyance roller pair in the image forming apparatus according to the first embodiment.

Next, the conveyance operation of the sheet S in the sheet reversing unit 100D is described. FIG. 4 illustrates the sheet S being conveyed to the second reverse conveyance roller pair 22*b*, FIG. 5 illustrates the sheet S stopped by the second reverse conveyance roller pair 22*b*, and FIG. 6 illustrates the sheet S being reversed and conveyed by the second reverse conveyance roller pair 22*b*.

When double-sided printing is performed as described above, as illustrated in FIG. 4, the sheet S is conveyed to the first reverse conveyance roller pair 22*a* and the second reverse conveyance roller pair 22*b* of the sheet reversing unit 100D via the pre-reverse conveyance path 64 after passing through the fixing unit 12. The first reverse conveyance roller pair 22*a* and the second reverse conveyance roller pair 22*b* are configured to be rotatable forward and reverse, and they first convey the sheet S in the first direction indicated by the arrow A and guide it into the reversing conveyance path 65. Then, the sheet S is conveyed by the second reverse conveyance roller pair 22*b* to the reversing conveyance path 65 until the trailing edge of the sheet S in the first direction passes the entrance of the re-conveyance path 67, which is the branch point between the reversing conveyance path 65 and the re-conveyance path 67.

Figure 5:
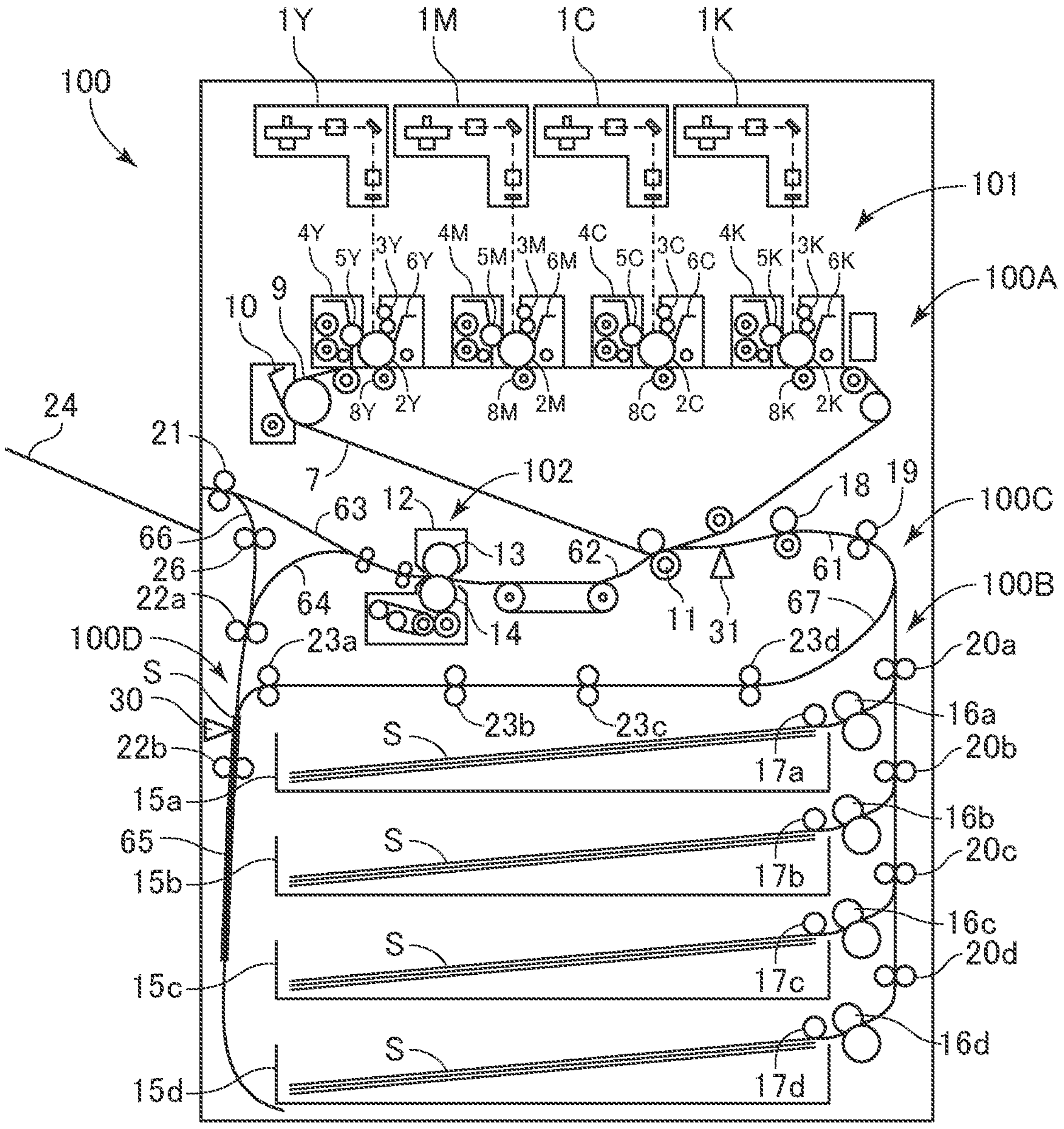
FIG. 5 illustrates the state in which a sheet is stopped by the second reverse conveyance roller pair in the image forming apparatus according to the first embodiment.
Figure 6:
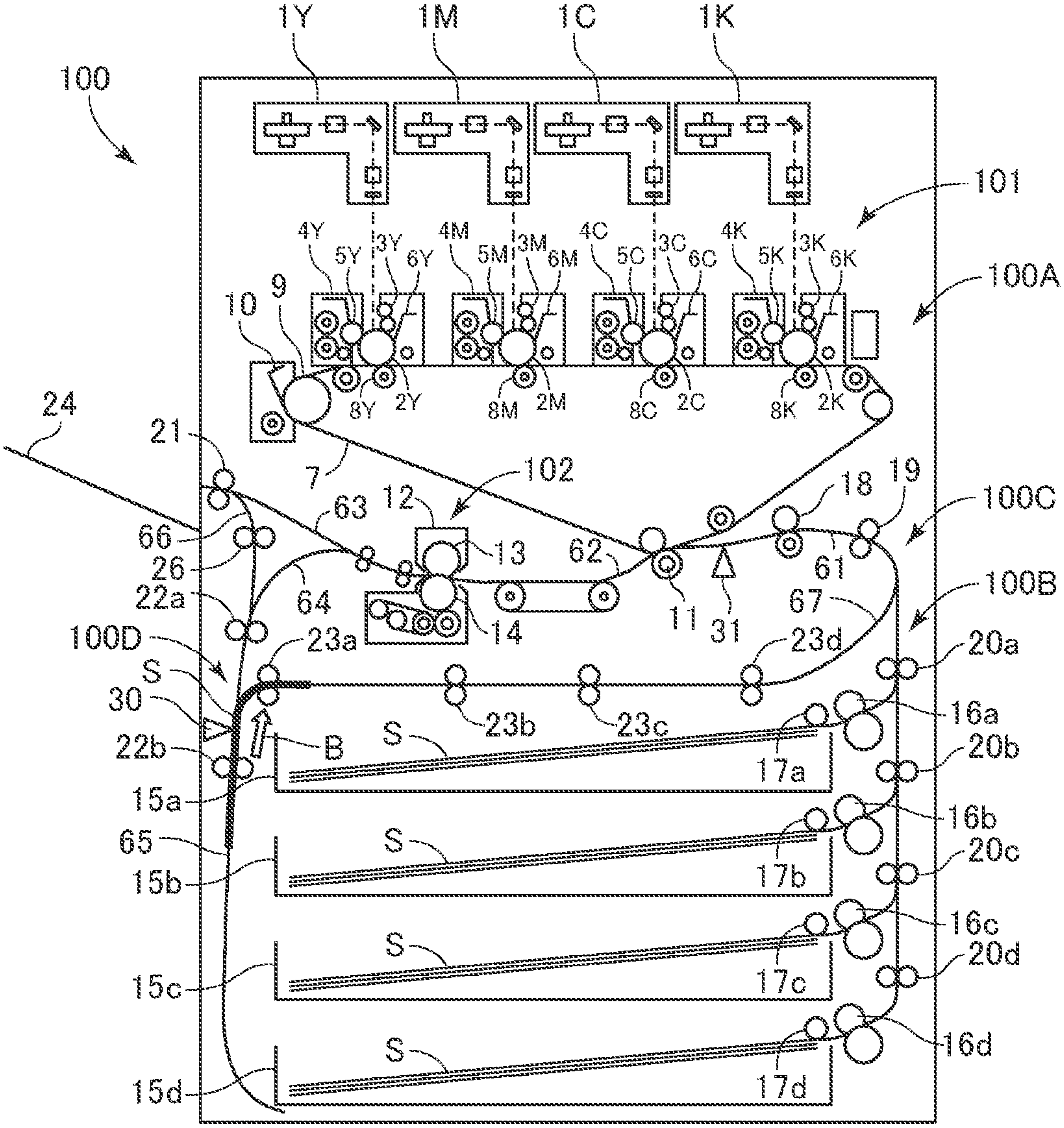
FIG. 6 illustrates the state in which a sheet is reversed and conveyed by the second reverse conveyance roller pair in the image forming apparatus according to the first embodiment.

Then, as illustrated in FIG. 5, when the trailing edge of the sheet S in the first direction passes the entrance of the re-conveyance path 67, the second reverse conveyance roller pair 22*b* is stopped to stop the conveyance of the sheet S. Then, as illustrated in FIG. 6, the rotation of the second reverse conveyance roller pair 22*b* is inverted (reversed) and the sheet S is conveyed in the second direction, which is opposite to the first direction indicated by the arrow B, and the sheet S is conveyed to the re-conveyance path 67. The sheet conveyed to the re-conveyance path 67 as described above is conveyed to the registration roller pair 18 by the double-sided conveyance roller pairs 23*a*, 23*b*, 23*c*, and 23*d*. The sheet is then conveyed again toward the secondary transfer roller 11 in the image forming unit 100A to form an image on the second side of the sheet S.

When reversing the conveyance direction of the sheet S with the second reverse conveyance roller pair 22*b*, the sheet S is always temporarily stopped to drive the second reverse conveyance roller pair 22*b* in reverse. The time depends on the type and performance of the actuator, but in the case of an inexpensive stepping motor, a minimum static period of about 50 ms is required to prevent step-out. In other words, when double-sided printing is performed by the image forming apparatus 100, the sheet S is always temporarily stopped in the sheet reversing unit 100D due to its structure.

Position and Operation of Image Sensor

Figure 7A:
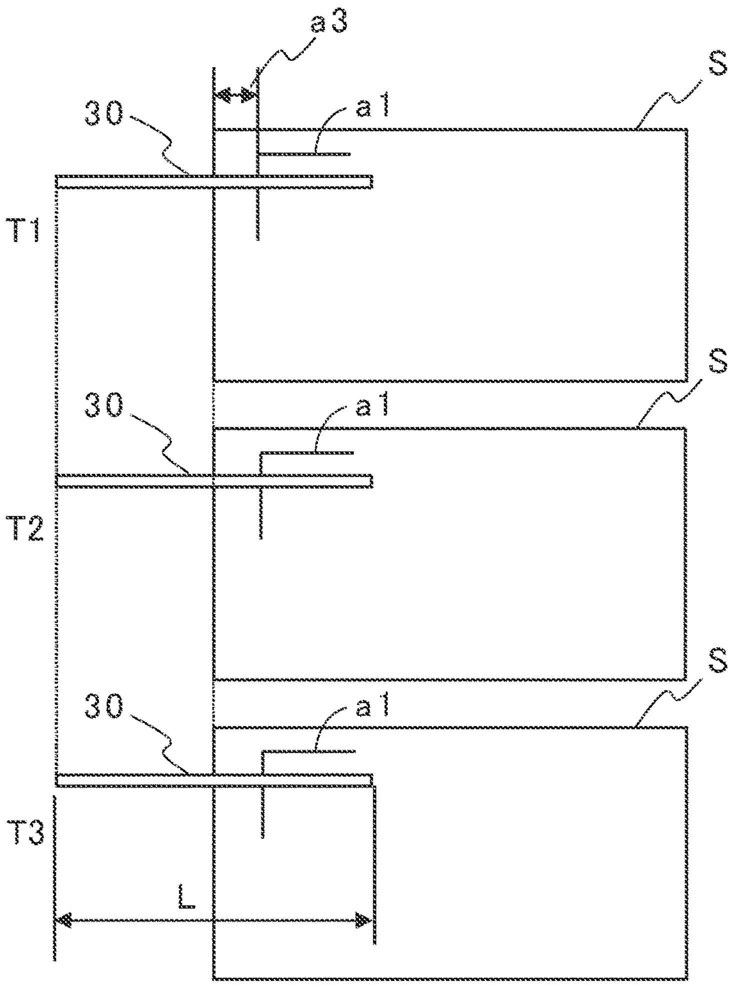
FIG. 7A illustrates the positional relationship between the sheet and the image sensor at time points T1 to T3 when the sheet is stopped.
Figure 7B:
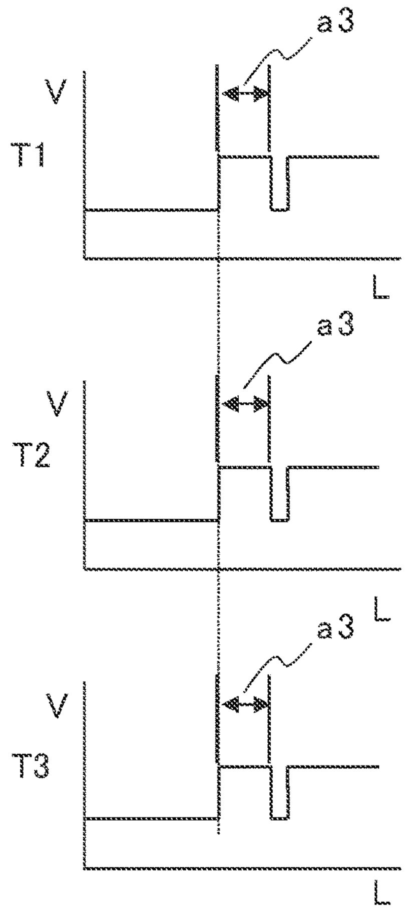
FIG. 7B illustrates the voltage signals of the image sensor at time points T1 to T3 when the sheet is stopped.
Figure 7C:
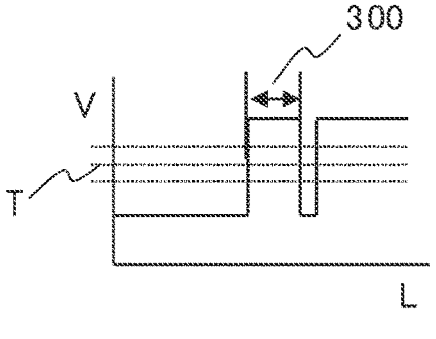
FIG. 7C illustrates the signal waveform of the image sensor acquired when the sheet is stopped.

Next, arrangement and operation of the image sensor 30 will be described with reference to FIGS. 5 and 7A to 7C. FIG. 7A illustrates the positional relationship between the sheet and the image sensor at time points T1 to T3 when the sheet is stopped. FIG. 7B illustrates the voltage signals of the image sensor at time points T1 to T3 when the sheet is stopped. FIG. 7C illustrates the signal waveform of the image sensor acquired when the sheet of the first embodiment is stopped.

As illustrated in FIG. 5, the image sensor 30 is disposed at a position facing the first side of the sheet S and capable of detecting at least a portion of the image on the first side formed on the sheet S when the sheet S is stopped by the second reverse conveyance roller pair 22*b* in the sheet reversing unit 100D. Specifically, as illustrated in FIG. 7A, the image sensor 30 is disposed to detect a portion of the image a1 on the first side of the stopped sheet S and the trailing edge (end) of the sheet S in the first direction. In other words, the image sensor 30 is disposed to detect a portion of the image a1 on the first side of the stopped sheet S and the leading edge of the sheet S in the second direction (the upstream edge in the second direction).

As illustrated in FIG. 7A, since the conveyance of the sheet S is stopped by the second reverse conveyance roller pair 22*b*, the sheet S does not move at time points T1, T2, and T3. Therefore, as illustrated in FIG. 7B, the signal waveform of the voltage value V as the signal value read by the image sensor 30 at time points T1, T2, and T3 also does not move in the length L of the detection range of the image sensor 30. As illustrated in FIG. 7C, this allows the integrated signal waveform to be detected as a near rectangular wave signal with almost no blurring, even if the measurement is performed for a specified time so that the difference in the voltage value V can be detected. Therefore, even when converting to the image position information 300 for detecting the distance a3 in the calculation unit 201, the image position information 300 with reduced measurement error can be obtained, regardless of the setting of the threshold T and other factors.

As described above, in the image forming apparatus 100, even if the conveying speed of the sheet S is increased to improve productivity, the sheet S is stopped when the image on the first side of the sheet S is detected by the image sensor 30. This allows stable detection without affecting the detection accuracy with the image sensor 30 and improves the detection accuracy of the formation position of the image a1 on the sheet S. As a result, in the formation of an image on the second side, when the position of the image a1 on the first side is fed back to correct the position of the image on the second side, high front-to-back registration accuracy can be achieved, preventing deterioration of the quality of the product.

Second Embodiment

Figure 8B:
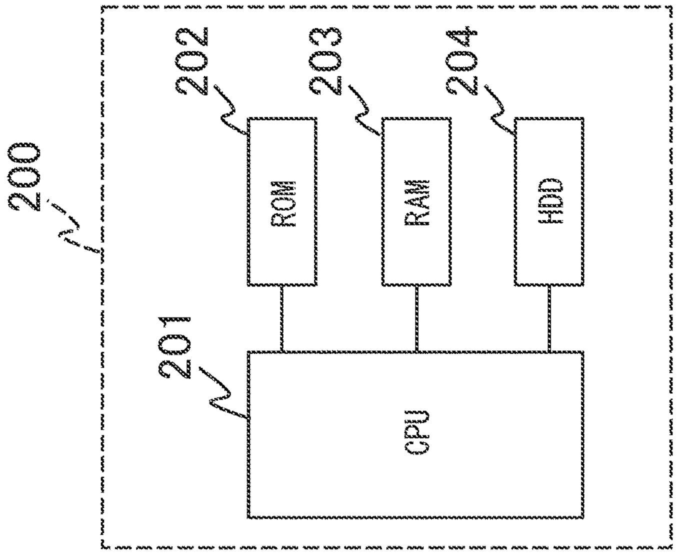
FIG. 8B is a block diagram of a control unit.
Figure 8A:
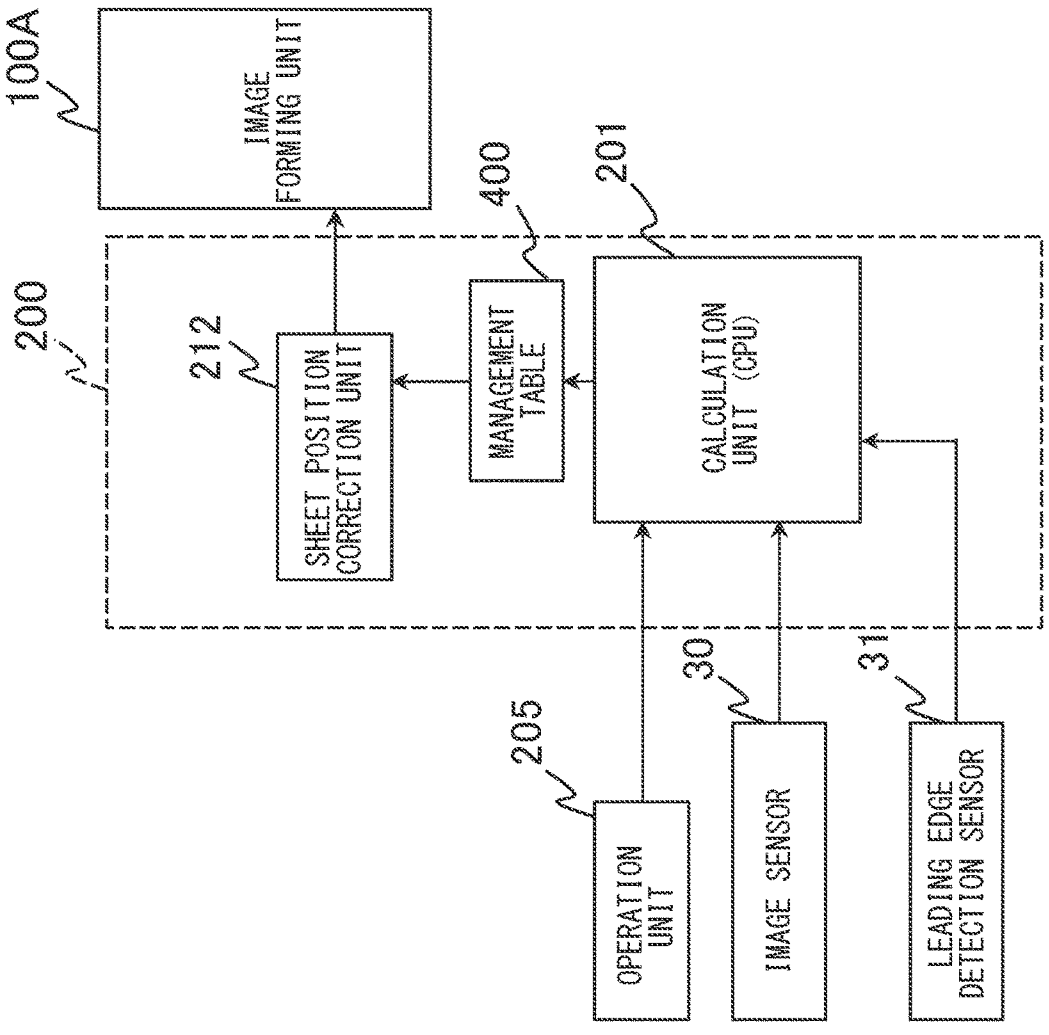
FIG. 8A is a block diagram of a control system of an image forming apparatus according to a second embodiment.
Figure 9A:
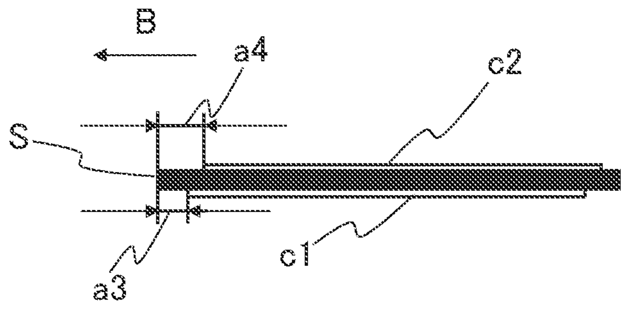
FIG. 9A illustrates the image position on the sheet before correction of the conveying speed by the registration roller pair.
Figure 9B:
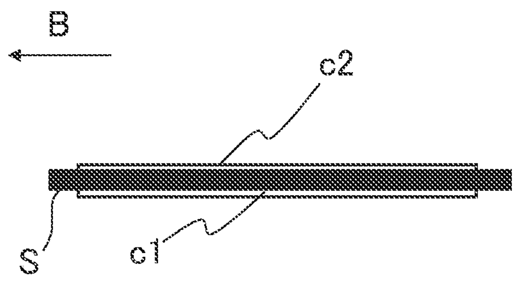
FIG. 9B illustrates the image position on the sheet after correction of the conveying speed by the registration roller pair.

The second embodiment, which is a partial modification of the first embodiment described above, is then described using FIGS. 8A, 8B, 9A, and 9B. FIG. 8A is a block diagram of the control system of the image forming apparatus according to the second embodiment, and FIG. 8B is a block diagram of the control unit. FIG. 9A illustrates the image position on a sheet before correction of the conveying speed by the registration roller pair, and FIG. 9B illustrates the image position on a sheet after correction of the conveying speed by the registration roller pair. In the description of the second embodiment, the same reference numerals are used for parts similar to those in the first embodiment described above, and their description is omitted.

In the first embodiment, when adjusting the position of the image formed on the second side of the sheet S, the image is corrected by the image position correction unit 211 (see FIG. 2A), which is then formed on the second side of the sheet S by the image forming unit 100A. Apart from this, in the second embodiment, the image formation position is adjusted by adjusting the speed of the sheet S and the timing of the sheet S passing through the secondary transfer roller 11 in the image forming unit 100A. The adjustment of the image formation position according to the second embodiment and the adjustment of the image formation position according to the first embodiment may be performed simultaneously in combination.

Specifically, as illustrated in FIGS. 8A and 8B, the image forming apparatus 100 according to the second embodiment includes a sheet position correction unit 212 instead of the image position correction unit 211 (see FIG. 2A) of the image processing unit 210. The sheet position correction unit 212 controls the speed of the sheet S that is conveyed from the registration roller pair 18 to transfer the toner images on the second side by the secondary transfer roller 11, so that the position of the image to be formed (toner images to be transferred) is at the target position.

The image forming apparatus 100 includes a leading edge detection sensor 31 that detects the tip position of the sheet S between the registration roller pair 18 and the secondary transfer roller 11 in the sheet conveyance direction (see FIG. 1), and outputs a signal indicating that the leading edge of the sheet S is detected to the calculation unit 201. The leading edge detection sensor includes a scanner sensor such as a contact image sensor (CIS) or a charge coupled device (CCD), or a photoelectric sensor such as a transmission or retro-reflection sensor.

Furthermore, the management table 400 in the second embodiment stores a conversion formula (correction amount) of the speed of the registration roller pair 18 for correcting deviation of the image formation position from the ideal position of the image with respect to the sheet S. As in the first embodiment, the management table 400 stores, for each sheet, the amount of deviation of the image formation position calculated by the calculation unit 201 and the conversion formula for correcting the amount of deviation.

As described above, the formation position of the image formed on the sheet S by the image forming operation may not be the ideal formation position. As illustrated in FIG. 9A, an image c1 is formed on the first side of the sheet S at a position deviating from the ideal position, and an image c2 is formed on the second side. When no correction is made, the distance between the trailing edge of sheet S in the first direction (see FIG. 4), i.e., the leading edge in the second direction (see FIG. 6), and the edge of the image c1 on the first side is the distance a3. The distance between the leading edge of the sheet S in the second direction and the edge of the image c2 on the second side is a distance a4. The difference between the distance a3 and the distance a4 is the amount of deviation between the front and back, and the front-to-back registration accuracy is not good.

Setting information input from the operation unit 205 is input to the calculation unit 201. In addition, the image position information 300 (the position of the image c1 formed on the first side of the sheet S, which is the distance a3) detected by the image sensor 30, the leading edge position of the sheet S detected by the leading edge detection sensor 31, and other information are input to the calculation unit 201. The calculation unit 201 stores these pieces of information in the management table 400.

Then, the sheet position correction unit 212 calculates the rotational speed of the registration roller pair 18 by the conversion formula of the management table 400 based on the image position information 300 detected by the image sensor 30 and the information of the leading edge position of the sheet S detected by the leading edge detection sensor 31. The sheet position correction unit 212 then corrects the rotational speed of the registration roller pair 18 by accelerating or decelerating it to that calculated speed, so that the image c2 on the second side is aligned with the image c1 on the first side. In other words, the speed of the registration roller pair 18 is controlled so that the distance a4 is equal to the distance a3. As a result, as illustrated in FIG. 9B, the position of the image c2 (toner images) transferred to the second side of the sheet S by the secondary transfer roller 11 is corrected to obtain good front-to-back registration accuracy.

The other configurations, operations, and effects in the second embodiment are the same as those in the first embodiment, so the description thereof is omitted.

Third Embodiment

Figure 10:
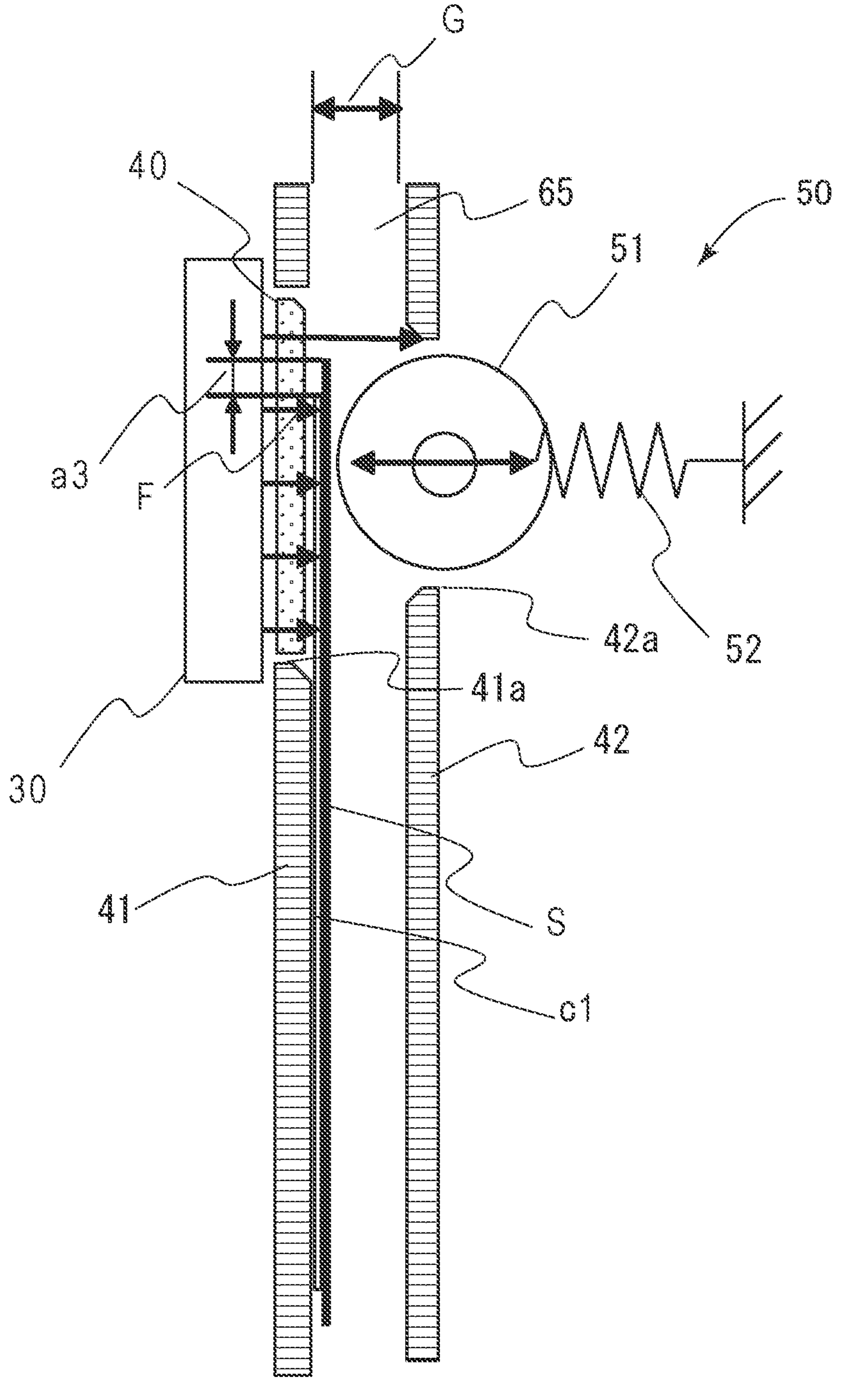
FIG. 10 is a schematic cross-sectional view of a sheet pressing mechanism according to a third embodiment.
Figure 12A:
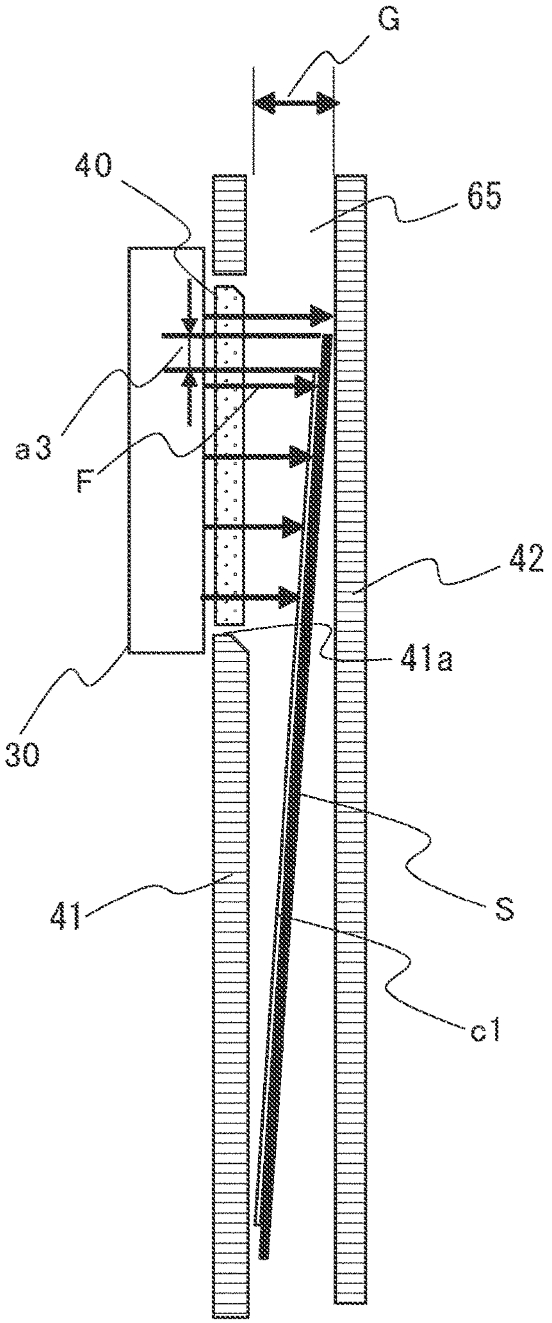
FIG. 12A is a schematic cross-sectional view of the reversing conveyance path with the trailing edge of the sheet in the first direction inclined away from the image sensor.
Figure 12B:
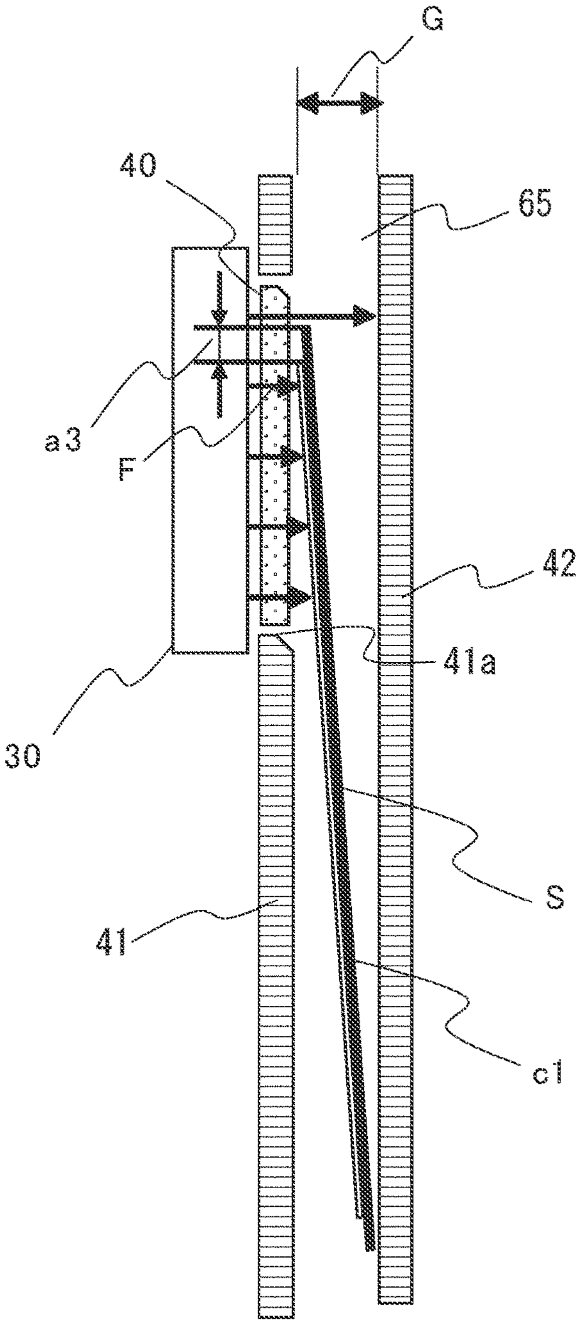
FIG. 12B is a schematic cross-sectional view of the reversing conveyance path with the trailing edge of the sheet in the first direction inclined closer to the image sensor.

The third embodiment, which is a partial modification of the first and second embodiments described above, is then described using FIGS. 10, 12A, and 12B. FIG. 10 is a schematic cross-sectional view of a sheet pressing mechanism according to the third embodiment. FIG. 12A is a schematic cross-sectional view of the reversing conveyance path with the trailing edge of the sheet in the first direction inclined away from the image sensor. FIG. 12B is a schematic cross-sectional view of the reversing conveyance path with the trailing edge of the sheet in the first direction inclined closer to the image sensor.

In the first and second embodiments described above, the image on the first side is detected when the sheet S is temporarily stopped during reversal. However, in order to further improve measurement accuracy, it is necessary to take into account the measurement error effect caused by the flutter of the sheet S. As illustrated in FIGS. 12A and 12B, when the sheet S is conveyed through the reversing conveyance path 65 (see FIG. 1), the sheet S is conveyed through a gap G formed between a conveyance guide 41 and a conveyance guide 42 as guide units. Within the gap G, a sheet, especially one with low stiffness, will freely change its posture and shape. A through hole 41*a* is formed in the conveyance guide 41, and a transparent glass 40 as the transmissive unit of the image sensor 30 is installed in the through hole 41*a* so that it is exposed to the reversing conveyance path 65. The transparent glass 40 allows the irradiation light of the image sensor 30 to illuminate the sheet S and allows the reflected light to pass through.

At this time, as illustrated in FIG. 12A, the trailing edge of the sheet S in the first direction may be inclined away from the image sensor 30. At this time, as illustrated in FIG. 12A, the trailing edge of the sheet S in the first direction may be inclined closer to the image sensor 30. Then, the distance F from the image sensor 30 to the sheet S varies in the sheet conveyance direction.

As described above, the image sensor 30 includes, for example, an image sensor such as a CIS, and due to its characteristic of detecting reflected light and converting it into a voltage, changes in the distance and angle to the measurement target will cause variations in the charged voltage due to changes in the size and angle of the reflected light. Therefore, the image sensor generally has a focal length suitable for measurement.

Therefore, as illustrated in FIGS. 12A and 12B, when the posture or shape of the sheet changes freely in the gap G, the voltage value measured by the image sensor 30 will vary, resulting in a distance a3 that is not correct when converted to the image position information 300. That is, the image position information 300 contains a measurement error. Then, when correcting the image formation position on the second side, an image that is shifted by the amount of the error is formed on the second side, which degrades the quality of the product.

Therefore, in the third embodiment, as illustrated in FIG. 10, a pressing mechanism 50 is provided to press the sheet S toward the transparent glass 40 of the image sensor 30 to correct the position and posture of the sheet S when the image c1 of the sheet S is detected by the image sensor 30.

Specifically, as illustrated in FIG. 10, the pressing mechanism 50 includes a contact member 51, which is formed in a cylindrical shape and contacts the sheet S, and an urging member 52, which includes a coil spring and urges the contact member 51 toward the image sensor 30. As a result, when the sheet S is stopped by the second reverse conveyance roller pair 22*b*, especially the trailing edge of the sheet S in the first direction and the edge of the sheet S with a distance a3 from the edge of the image are restrained to the transparent glass 40. This brings the distance F from the image sensor 30 to the sheet S closer to a certain distance. That is, the distance and angle between the image sensor 30 and the first side of the sheet S approaches a constant, which stabilizes the magnitude and angle of the reflected light and reduces the measurement error in the voltage value. Thus, the measurement error of the image sensor 30 is reduced, making it possible to obtain the image position information 300 with a very small measurement error for the correct distance a3. Therefore, the pressing mechanism 50 in the third embodiment reduces the fluttering of the sheet S, resulting in good correction of the image formation position in image formation on the second side, and realizing high front-to-back registration accuracy.

Possibility of Other Embodiments

In the first and third embodiments described above, the image forming apparatus 100 is an image forming apparatus of electrophotographic system. However, the present invention is not limited thereto, and a method of correcting a position at which an image is formed on a sheet by correcting an image to be formed on the sheet or correcting a conveying speed of the sheet can be similarly applied to other types of image forming apparatuses, such as an inkjet image forming apparatus. Therefore, even in such an image forming apparatus, in those that reverse the sheet conveyance direction when printing on both sides of the sheet, the quality of the product can be improved by detecting the image on the sheet with an image sensor while the sheet is temporarily stopped.

In the first and third embodiments, the type and position of the image formed on the sheet S is not limited to a specific image. In other words, whether the image is, for example, a cross mark (so-called "registration mark") or a photographic image, as long as the position of the image relative to the sheet can be detected, there are no restrictions on the type or position of the image.

In the first to third embodiments, the sheet is temporarily stopped when reversing the sheet conveyance direction in the sheet reversing unit 100D, and the image on the sheet is detected by the image sensor 30 at that time. However, as long as the image forming apparatus includes a conveyance unit that conveys a sheet after an image is formed on the sheet by the image forming unit 100A, and can stop the conveyance of the sheet, the image sensor may detect the image when the conveyance unit temporarily stops the sheet. In this case, the image sensor would be disposed opposite the first side at the position where the sheet is temporarily stopped in the conveyance unit. Examples of cases in which a sheet is temporarily stopped by the conveyance unit include when correcting skew of a sheet or when punching holes in a sheet.

In the first to third embodiments, the image sensor 30 detects an image in a range of only the distance L in the sheet conveyance direction, that is, detects an image in a range in which the distance between the trailing edge of the sheet in the first direction and the edge of the image can be detected. However, the embodiments are not limited thereto, and the image may be read from the entire sheet, i.e., any image in any range may be detected as long as the position of the image formed on the sheet can be detected.

In the first to third embodiments, the image sensor 30 is disposed at the position to detect the vicinity of the trailing edge of the sheet in the first direction (the leading edge in the second direction) when the sheet is stopped by the second reverse conveyance roller pair 22*b*. This is because when correcting the position of the image on the second side of the sheet, the edge of the sheet in the second direction is the leading edge of the sheet, and the distance from the leading edge is adjusted. However, the image sensor 30 may be disposed to detect the vicinity of the leading edge of the sheet in the first direction (trailing edge in the second direction) when the sheet is stopped by the second reverse conveyance roller pair 22*b*. That is, if the distance between the leading edge of the sheet in the first direction and the edge of the image from there can be detected, the distance between the trailing edge of the sheet in the first direction and the edge of the image from there may be calculated based on the size of the image formed on the first side of the sheet.

In the second embodiment, when adjusting the speed of the sheet at the registration roller pair 18 by the sheet position correction unit 212, the leading edge detection sensor 31 detects the position of the leading edge of the sheet and adjusts the speed accordingly. However, for example, in a system where the registration roller pair 18 is temporarily stopped to correct skewed sheets at the registration roller pair 18 and then resumes conveyance, the amount of sheet feed from the timing of resumption of conveyance by the registration roller pair 18 may be used as the position of the leading edge of the sheet.

In the third embodiment, the contact member 51 of the pressing mechanism 50 is a cylindrical member. However, the contacting member 51 may be any shape such as a flat plate as long as it can stabilize the distance and angle between the image sensor 30 and the sheet S. The contact member 51 may include a single contact member 51 or a plurality of contact members, and their positions may be different from those shown in FIG. 10. In short, it is sufficient that the sheet can be pressed toward the image sensor 30. Although the urging member 52 was described as being a coil spring or the like, it may also be a mechanism that can change the position of the contact member 51 variably, such as a solenoid or cam mechanism, or even a configuration that moves the conveyance guide 42 to narrow the gap G. In addition, although the pressing mechanism 50 is described as an example of a pressing unit, any configuration of the pressing unit may be used as long as the sheet can be pressed against the transmissive unit, for example, by blowing air onto the sheet and pressing it against the transparent glass 40.

The present disclosure can also be realized by supplying a program that realizes one or more functions of the above example to a system or apparatus via a network or storage medium, and processing in which one or more processors in the computer of the system or apparatus read and execute the program. It can also be realized by a circuit that realizes one or more functions (for example, ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-178496, filed Nov. 1, 2021, which is hereby incorporated by reference herein in its entirety.

What is claimed is:

1. An image forming apparatus comprising:

an image forming unit configured to form an image on a sheet;

a reversing unit configured to convey a sheet conveyed from the image forming unit in a first direction, stop the conveyance, and then convey the sheet in a second direction, which is opposite to the first direction, the reversing unit including:

a reversing conveying path where the sheet is conveyed in the first direction; and a re-conveyance path that is branched from the reversing conveyance path and where the sheet is conveyed in the second direction after the stop of the conveyance of the sheet;

an image detection unit disposed in the reversing conveyance path and downstream of a branch point, where the re-conveyance path is branched from the reversing conveyance path, in the first direction; and a control unit configured to control the reversing unit and the image detection unit, wherein the control unit is configured to detect the image on the sheet with the image detection unit, while the sheet conveyance is stopped by the reversing unit, at a position downstream of the branch point in the first direction in the reversing conveyance path.

2. The image forming apparatus according to claim 1, wherein:

the image detection unit is disposed to detect an area including an edge of the sheet stopped by the reversing unit and an edge of the image on the sheet, and the control unit is configured to acquire a position of the edge of the sheet and a position of the edge of the image formed on the sheet from a detection result from the image detection unit.

3. The image forming apparatus according to claim 2, wherein:

the image detection unit is disposed to detect an area including an upstream edge in the second direction of the sheet stopped by the reversing unit, and the control unit is configured to acquire a position of the upstream edge of the sheet in the second direction and a position of the upstream edge of the image formed on the sheet in the second direction.

4. The image forming apparatus according to claim 2, wherein:

the re-conveyance path conveys the sheet back toward the image forming unit, the image detection unit is disposed opposite a first side of the sheet stopped by the reversing unit, and the control unit is configured to adjust the position at which an image is formed on a second side of the sheet, which is opposite to the first side, by the image forming unit based on the position of the edge of the sheet and the position of the edge of the image formed on the sheet.

5. The image forming apparatus according to claim 4, wherein the control unit is configured to adjust the position at which the image is formed on the second side of the sheet by adjusting the position at which the image is formed on the sheet by the image forming unit.

6. The image forming apparatus according to claim 4, further comprising:

a conveyance unit configured to convey a sheet to the image forming unit, wherein the control unit is configured to adjust the position at which the image is formed on the second side of the sheet by adjusting the speed at which the sheet is conveyed to the image forming unit by the conveyance unit.

7. The image forming apparatus according to claim 6, wherein:

the conveyance unit includes a registration roller pair disposed upstream of the image forming unit in a sheet conveyance direction, and the control unit is configured to adjust the position at which the image is formed on the second side of the sheet by adjusting the speed at which the sheet is conveyed to the image forming unit by the registration roller pair.

8. The image forming apparatus according to claim 1, wherein the image detection unit is a contact image sensor.

9. The image forming apparatus according to claim 1, wherein the image detection unit is a charge coupled device.

10. An image forming apparatus comprising:

an image forming unit configured to form an image on a sheet;

a reversing unit configured to convey a sheet conveyed from the image forming unit in a first direction, stop the conveyance, and then convey the sheet in a second direction, which is opposite to the first direction;

an image detection unit disposed to detect at least a portion of the image on the sheet stopped by the reversing unit;

a control unit configured to control the reversing unit and the image detection unit;

a guide unit; and a pressing unit, wherein the image detection unit includes a transmissive unit that allows light to pass through and irradiate the sheet, wherein the guide unit is configured to form a conveyance path to guide the sheet conveyed by the reversing unit and expose the transmissive unit to the conveyance path, wherein the pressing unit is configured to press the sheet against the transmissive unit, wherein the control unit is configured to detect the image on the sheet with the image detection unit while the sheet conveyance is stopped by the reversing unit.

11. The image forming apparatus according to claim 10, wherein the pressing unit includes:

a contact member configured to contact the sheet; and an urging member configured to urge the contact member toward the transmissive unit.

12. An image forming apparatus comprising:

an image forming unit configured to form an image on a sheet;

a conveyance unit configured to convey the sheet on which an image has been formed in the image forming unit and stop the sheet conveyance;

an image detection unit configured to detect the image on the sheet; and a control unit configured to control the conveyance unit and the image detection unit, wherein the control unit is configured to detect at least a portion of the image on the sheet with the image detection unit while the sheet conveyance is stopped by the conveyance unit, wherein the image detection unit is disposed to detect an area including an edge of the sheet stopped by the conveyance unit and an edge of the image on the sheet, and wherein the control unit is configured to acquire a position of the edge of the sheet and a position of the edge of the image formed on the sheet from a detection result from the image detection unit.

* * * * *